United States Patent
Oger et al.

(10) Patent No.: US 7,473,365 B2
(45) Date of Patent: Jan. 6, 2009

(54) METHOD AND INSTALLATION FOR THE BIOLOGICAL TREATMENT OF WATER USING ACTIVATED SLUDGE AND COMPRISING AERATION REGULATION

(75) Inventors: Loic Oger, Saint-Gilles (FR); Annie Tazi Pain, Asnieres (FR); Michele Payraudeau, Paris (FR)

(73) Assignee: OTV SA S.A., Saint-Maurice Cedex (FR)

( * ) Notice: Subject to any disclaimer, the term of this patent is extended or adjusted under 35 U.S.C. 154(b) by 430 days.

(21) Appl. No.: 10/567,236

(22) PCT Filed: Jul. 22, 2004

(86) PCT No.: PCT/FR2004/001963

§ 371 (c)(1), (2), (4) Date: May 3, 2006

(87) PCT Pub. No.: WO2005/021446

PCT Pub. Date: Mar. 10, 2005

(65) Prior Publication Data
US 2006/0283794 A1    Dec. 21, 2006

(30) Foreign Application Priority Data
Aug. 4, 2003    (FR) .................................. 03 09629

(51) Int. Cl.
*C02F 3/30* (2006.01)
(52) U.S. Cl. .................... 210/614; 210/630; 210/903
(58) Field of Classification Search ............ 210/601, 210/609, 614, 620, 630, 903
See application file for complete search history.

(56) References Cited

U.S. PATENT DOCUMENTS

| | | | |
|---|---|---|---|
| 5,482,630 A | | 1/1996 | Lee et al. |
| 5,520,812 A | * | 5/1996 | Ryhiner et al. ............... 210/614 |
| 5,582,734 A | * | 12/1996 | Coleman et al. ............ 210/614 |
| 5,589,068 A | | 12/1996 | Nielsen |
| 5,906,746 A | * | 5/1999 | Helmo et al. ............... 210/614 |
| 6,254,778 B1 | * | 7/2001 | Chudoba et al. ............ 210/614 |
| 7,014,769 B1 | * | 3/2006 | Cox et al. .................... 210/614 |
| 2006/0049103 A1 | * | 3/2006 | Reid .......................... 210/605 |

FOREIGN PATENT DOCUMENTS

| | | |
|---|---|---|
| EP | 0550367 | 12/1992 |
| WO | WO 00/37369 | 6/2000 |

OTHER PUBLICATIONS

Hansen, Joachim, "Fuzzy-Regelungen zur Optimierung der Nährstoffelimination in kommunalen Kläranlagen," pp. 2259-2268, XP-000803516, 1998.

* cited by examiner

*Primary Examiner*—Frank M Lawrence
(74) *Attorney, Agent, or Firm*—Coats & Bennett, P.L.L.C.

(57) ABSTRACT

The biological water or wastewater treatment process described herein alternates aeration and anoxic phases during a water treatment process. According to one exemplary process, the water or wastewater is directed into a biological tank. The water or wastewater in the biological tank is aerated until measured nitrate or redox values meet high nitrate or high redox set value conditions relative to minimum aeration and maximum aeration time requirements. Subsequently, the water or wastewater is subjected to anoxic treatment until the measured nitrate value meets low nitrate set value conditions relative minimum and maximum anoxia time requirements.

10 Claims, 9 Drawing Sheets

METHOD AND INSTALLATION FOR THE BIOLOGICAL TREATMENT OF WATER USING ACTIVATED SLUDGE AND COMPRISING AERATION REGULATION This application is a U.S. National Stage application of PCT Application No. PCT/FR04/01963, with an international filing date of Jul. 22, 2004. Applicant claims priority based on French application serial no. 03 09629 filed Aug. 4, 2003.

The invention relates to the domain of biological treatment of water for purification purposes.

This water may for example consist of waste town water or industrial water.

More precisely, the invention relates to biological treatments of water using the activated sludge technique or the mixed culture technique.

The activated sludge technique uses a free biomass, in other words not attached to a support, in at least one pond or tank provided with aeration means.

The mixed culture technique uses a free biomass and a biomass attached to a support maintained in suspension in a pond provided with aeration means.

According to these techniques, the biomass degrades carbonaceous pollution and also nitrogen pollution contained in the water to be treated.

To achieve this, the plant pond(s) is (are) provided with air or oxygen injection means (aeration by small bubbles, turbines, brushes, etc.), hereinafter referred to as "aeration means".

The operation of these aeration means may be sequenced so as to organise aeration and anoxia periods in the same pond.

According to another type of plant, at least one aerated zone and at least one non-aerated zone are provided in the same pond or in several ponds.

Aeration enables degradation of carbonaceous pollution of treated water and nitrification of this treated water.

Non-aeration of this water enables denitrification of the water.

The alternation of nitrification and denitrification phases helps to degrade nitrogen pollution of water to be treated.

It is found that the operation of aeration means and particularly the alternation of aeration and non-aeration phases need to be controlled.

Studies have shown that excessive addition of oxygen to the biomass by aeration means prevents correct elimination of nitrates, while insufficient oxygen addition limits destruction of ammonia.

Therefore the operation of aeration means needs to be continuously controlled so as to respect a compromise according to which the aeration means do not add too much or too little oxygen into aeration ponds.

Different means of achieving such control have been proposed in prior art.

According to a first approach, it was proposed to use a probe to detect the concentration of oxygen dissolved in water during its residence in activated sludge ponds and, depending on records kept and the content of $NH_4$ and $NO_3$ at the outlet, to vary the operating durations and intervals of the aeration means so as to dose the quantity of oxygen added by these means.

However, such a measurement of dissolved oxygen cannot maintain the nitrate content in the treated water at an always acceptable threshold when this dissolved oxygen content is below 0.5 mg/liter.

Therefore, it has been proposed to combine this measurement of the dissolved oxygen concentration with a measurement of the redox potential of water present in the activated sludge pond. Such a technique is described in patent FR 2779140. However, this technique has the disadvantage that it requires a frequent manual re-adjustment of set values of the redox potential. Redox regulation is particularly inefficient for biological plants using filtration membranes immersed in activated sludge.

The technique described in FR 2685692 proposes to measure the redox potential in the biological pond provided with aeration means, to slave operation of these aeration means to at least one set value of this redox potential and to slave this set value of the redox potential to a measurement of the nitrate and/or ammonia content in the treated effluent.

Although this technique is efficient, it has the disadvantage that it necessitates reliability of measurement instruments at all times, and particularly the nitrate meter or the ammonia meter that continuously correct the set values.

The purpose of this invention is to propose a process for biological treatment of water by activated sludge or mixed cultures, using control of aeration means enabling more efficient aeration regulation than is possible with processes according to the state of the art.

In particular, one purpose of this invention is to disclose such a process to continuously limit the content of nitrogen pollution in treated water to a very low level, in practice less than 10 mg/liter.

Another purpose of the invention is to disclose such a process that does not require a frequent manual adjustment of regulation thresholds with time.

Yet another purpose of the invention is to propose such a process that can be used for any type of activated sludge or mixed culture treatment plant, and particularly in plants using filtration membranes.

Another purpose of this invention is to disclose a process leading to optimisation and reduced energy consumption necessary for aeration.

Yet another purpose of the invention is to propose such a process providing greater reliability than processes according to prior art.

These various objectives are achieved with the invention that relates to a biological water treatment process including the following steps:

making the said water pass in at least one biological pond provided with a biomass, inside which oxidising and reducing periods are alternated by starting and stopping aeration means, and performing at least one separation step on the mixed liquor in the biological pond so as to obtain sludge and treated water, characterised in that it comprises preliminary steps consisting of:

fixing a minimum allowable aeration time (T1min), a maximum allowable aeration time (T1max), a minimum allowable non-aeration time (T2min) and a maximum allowable non-aeration time (T2max) of the said mixed liquor;

fixing a low set value (SB NO3) and at least one high set value (SH NO3) of the nitrate content in the treated water or the mixed liquor;

fixing at least one high set value of the SH redox potential of the said mixed liquor;

and in that it comprises additional steps consisting of:

continuously measuring the nitrate content in the treated water or the mixed liquor;

continuously measuring the redox potential of the mixed liquor in the aeration pond;

measuring the aeration time T1 and the non-aeration time T2 of the mixed liquor;

not aerating the mixed liquor either for as long as the measured nitrate content remains less than the said low set value (SB NO3) and the measured non-aeration time T2 has not reached the minimum allowable non-aeration time T2min, or when the measured nitrate content remains greater than the said low set value (SB NO3) and the measured non-aeration time T2 is less than the maximum allowable non-aeration time T2max, aerating the mixed liquor either for as long as the measured nitrate content remains greater than the said high set value (SH NO3) or when the value of the measured redox potential remains greater than the said high set value of the redox potential (SH redox) and the measured aeration time 1i is less than the minimum allowable aeration time T1min, or when the measured nitrate content remains less than the said high set value (SH NO3) or when the value of the measured redox potential remains less than the said high set value of the redox potential (SH redox) and the measured aeration time T1 is less than the maximum allowable aeration time T1max.

Therefore such a biological treatment process with regulation of aeration is based on a continuous measurement of nitrates in the treated water or the mixed liquor and the redox potential of the mixed liquor present in the biological pond.

According to the invention, air injection by aeration means is triggered as soon as one of the following conditions is observed:

first condition: the nitrate content in the treated effluent reaches a low set value (SN NO3) (low threshold) and a minimum anoxia duration has been observed (T2min), second condition (alternative): the nitrate content in the treated water or the mixed liquor (SN NO3) has not reached the low set value (SB NO3) but the maximum anoxia duration has been observed (T2max).

The minimum non-aeration duration T2min and the maximum non-aeration duration T2max form a timeout, the purpose of which is to act as a safety mechanism following a malfunction in the denitrification process or a malfunction of the nitrate content measurement means.

The maximum allowable non-aeration duration (T2max) limits the anoxia period when the nitrification process does not take place as required, in other words when it is not possible to reach the predetermined low value for the nitrate content or when a malfunction occurs at the nitrate measurement means.

The minimum allowable non-aeration duration (T2min) is sufficient to achieve minimum denitrification even in the case of a malfunction of these measurement means.

According to the invention, air injection by aeration means stops as soon as one of the following conditions is observed:

first condition: when the nitrate content in the treated effluent reaches a high set value (SH NO3) (high threshold) or when the redox potential of water in the aeration pond reaches a high set value (SH redox) (high threshold) and when the minimum aeration duration (T1min) has been observed;

second condition (alternative): when the high threshold of nitrates in the treated water (SH NO3) or the high redox potential threshold of water present in the aeration pond (SH redox) has not been reached but the maximum aeration duration T1max has been observed.

The use of a high redox potential set value limits aeration, for example during periods in which the polluting content is low.

The minimum aeration duration T1min and the maximum aeration duration T1max form a timeout, the purpose of which is to act as a safety mechanism in the case of a malfunction of the nitrification process or a malfunction of the nitrate content measurement means.

The minimum aeration duration T1min enables a minimum biomass aeration time and therefore provides safety in the case of a malfunction of the means for measuring the nitrate content in the treated water or the mixed liquor, or the redox potential of the mixed liquor present in the aeration pond.

The maximum aeration duration T1max prevents over-aeration of the biological pond when it is difficult to reach the high reference threshold of the nitrate content.

According to one variant of the invention, the process includes additional preliminary steps consisting of fixing a very high set value (STH NO3) of the nitrate content in the treated water or the mixed liquor and a very high set value (STH Redox) of the redox potential of the mixed liquor, and in that it consists of:

not aerating the mixed liquor either as long as the measured nitrate content remains less than the said low set value (SB NO3) and the measured non-aeration time T2 is less than the minimum allowable non-aeration time T2min, or when the measured nitrate content remains greater than the said low set value (SB NO3) but the measured non-aeration time T2 has not reached the maximum allowable non-aeration time T2max, aerating the mixed liquor either as long as the measured nitrate content remains greater than the said high set value (SH NO3) or the value of the measured redox potential remains greater than the said high redox potential set value (SH redox), and the measured aeration time T1 is less than the minimum allowable aeration time T1min, and the measured nitrate content has not reached the said very high set value (STH NO3) or the measured redox potential has not reached the said very high set value (STH Redox), or when the measured nitrate content remains less than the said high set value (SH NO3) or the measured redox potential value remains less than the said high set value of the redox potential (SH redox) but the measured aeration time T1 has not reached the maximum allowable aeration time T1 max.

The use of a very high nitrate threshold limits, over-aeration problems when the polluting content in the water to be treated is lower than normal. This type of event occurs particularly when the water to be treated is composed of urban effluents including water collected during a severe rain event.

The use of a very high nitrate threshold (STH NO3) avoids the addition of excess dissolved oxygen into the biological pond. When this very high threshold is reached, aeration is stopped without taking account of the minimum and maximum allowable aeration times. Thus, the process eliminates the use of a large number of timeouts adapted to the different qualities of water to be treated.

The use of a very high redox potential threshold (STH redox) stops aeration even if the very high nitrate level is not reached. The use of this very high redox potential threshold is particularly useful when the water to be treated has a low content of organic pollution. This occurs particularly when the water to be treated is an extremely dilute urban effluent, for example of the type collected during a night period.

Aeration may be used according to one or several given airflows. The value of these airflows may be fixed as a function of knowledge of the polluting content reached during a given period gained by experience, for example during a day. Thus for the treatment of urban effluents, a high airflow can be fixed during pollution peaks, and an average airflow and a low airflow can be fixed for pollution troughs (for example at night).

However, according to one variation of the invention, the airflow will be regulated continuously, which means that the process can be adapted to variations of the polluting content in the water to be treated.

According to this variation of the invention, the process according to the invention includes additional steps consisting of:
- fixing at least one set value of the slope of the curve representing the variation of the redox potential in the pond with time;
- continuously calculating the said slope;
- continuously regulating the dispensed airflow during aeration to keep a redox slope approximately equal to the said slope set value.

The process according to the invention then means that aeration and non-aeration periods can be managed, but also that the aeration intensity can also be managed during aeration periods.

Such integration of the calculation of the redox potential slope can thus further improve the quality of the process according to the invention.

The process according to the invention may be used in different types of water treatment processes.

Thus, the invention can be used when the separation step of the mixed liquor from the biological pond is a settlement step performed in a conventional lamellar or non-lamellar settling tank.

The invention can also be used when this separation step is a membrane filtration step. In this case, the membranes can be used in at least one external filtration loop with immersed or pressurised membranes, or they may be membranes immersed in the pond.

Such immersed membranes are generally coupled to specific aeration means designed to prevent them from getting clogged, or if they need to be unclogged, to unclog them.

In this case, the process according to the invention will preferably include an additional step consisting of measuring the flow of water filtered by the membranes and regulating the dispensed airflow for unclogging them depending on this filtered water flow. Air used to unclog membranes participates in oxygenation of the medium present in the pond since the membranes are immersed in it.

The invention also covers different types of plants for use of the process described above.

The invention thus covers any plant provided with means of conveyance of water to be treated, at least one biological pond collecting activated or mixed sludge provided with aeration means, membrane filtration means and means of evacuating filtered water from the said membrane filtration means,
characterised in that it has means of measuring the nitrogen content provided on the said evacuation means or in the said biological pond, means of measuring the redox potential provided in the said biological pond, regulation means designed to act on the said aeration means as a function of measurements transmitted by the said nitrate measurement means and redox potential measurement means, the said regulation means including means of inputting redox potential set value(s), nitrate concentration set value(s), and minimum and maximum aeration and non-aeration times.

According to one variant, the said plant regulation means also include means of inputting the set value(s) of the redox slope.

According to one variant, the said membrane filtration means are provided on a loop external to the main activated sludge pond with immersed or pressurised membranes.

According to another variant, the said membrane filtration means are immersed in the said biological pond and cooperate with aeration means capable of dispensing air to prevent them from getting clogged or to unclog them.

In this case, the plant preferably includes means of measuring the filtered water flow provided on the said evacuation means and second regulation means designed to act on the said aeration means as a function of measurements transmitted by the said flow measurement means.

The invention and its various advantages will be easily understood after reading the following description of different embodiments of the invention given with reference to the drawings in which:

FIGS. 1 to 4 diagrammatically show different biological water treatment plants for implementation of the process according to the invention;

Figure 1:
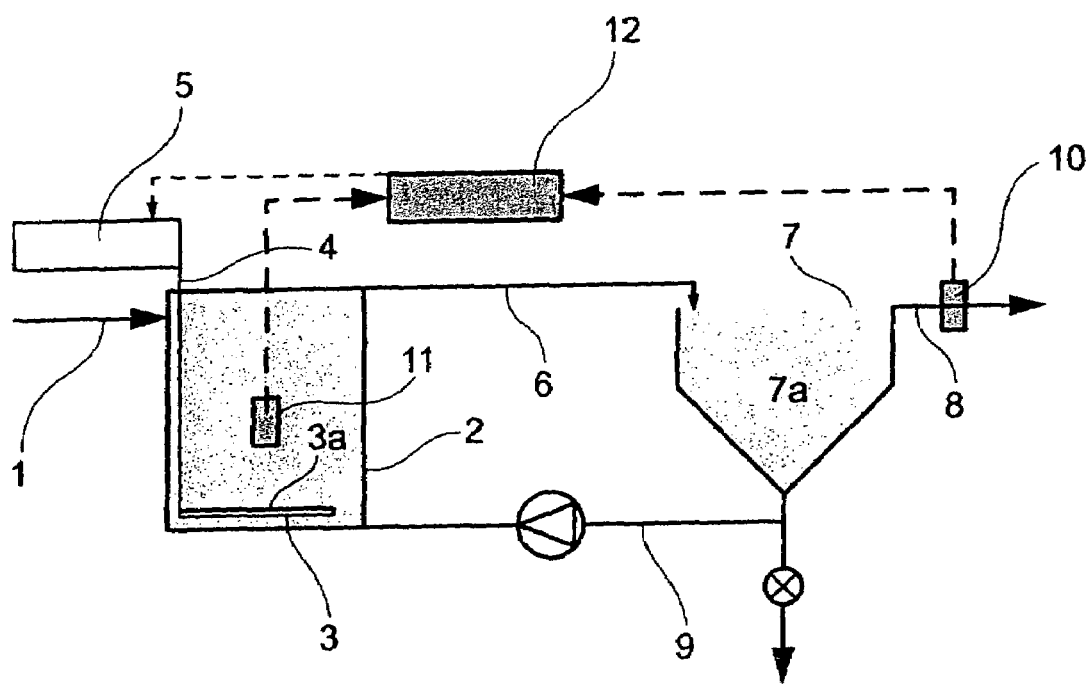

FIG. 1 diagrammatically shows a plant for the biological treatment of waste water.

This plant includes conveyance means 1 for water to be treated, a biological pond 2 containing the biomass and provided with aeration means 3.

The aeration means 3 include an air conveyance pipe 4 connected to an aeration manifold 3a provided in the lower part of the pond 2 and means 5 of starting and stopping aeration, and when required adjusting the airflow dispensed through the manifold 3a.

The biomass present in the biological pond 2 degrades the carbonaceous pollution and nitrogen pollution by alternation of aeration phases during which the aeration means 3 are in operation and anoxia phases during which the aeration phases are not in operation.

The mixed liquor composed of water and sludge present in the aeration pond 2, is evacuated through a pipe 6 that directs this mixed liquor to the separation means 7.

In fact, these means are composed of a settling tank 7a. This settling tank 7a separates the mixed liquor into a treated effluent evacuated through a pipe 8 and sludge 9 at least partly recycled to the biological pond 2.

The plant includes means 10 of measuring the nitrate content (hereinafter referred to as the "nitrate meter") provided on the evacuation pipe 8 for the treated water from the settling tank 7a, and means 11 of measuring the redox potential installed in the biological pond 2, for implementation of the process according to the invention. As a variant, the nitrate meter could be installed in the mixed liquor.

The plant also includes regulation means 12 designed to act on the said aeration means 3, 3a, 4, and 5 as a function of measurements 10 and redox potential measurement means 11. These regulation means 12 include means of inputting redox potential set value(s), nitrate content set value(s) and the minimum and maximum aeration and non-aeration times.

Figure 2:
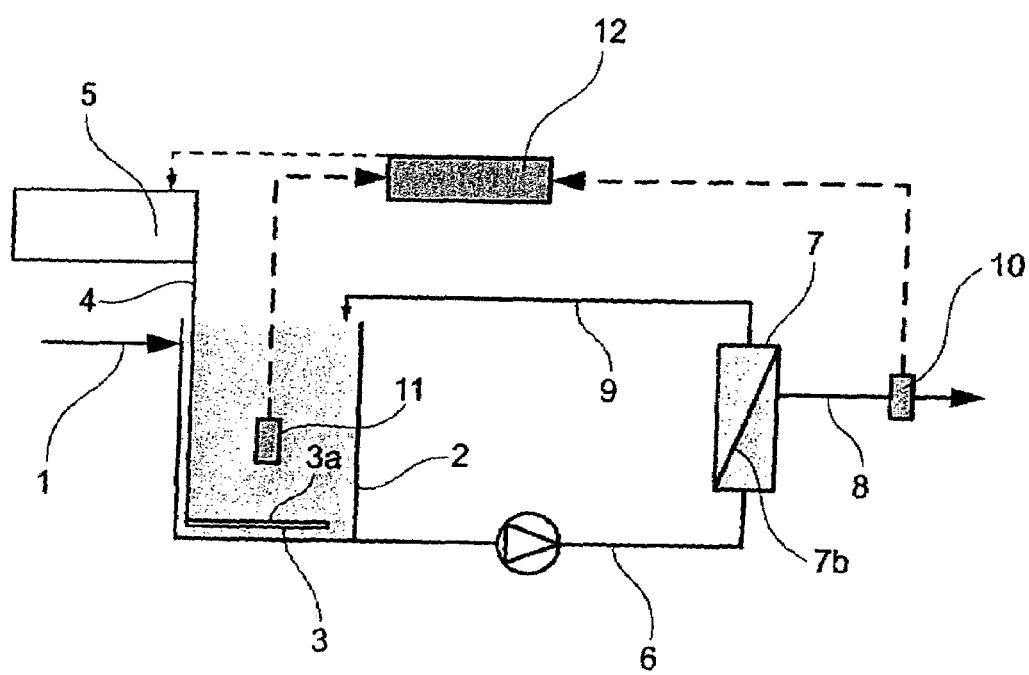

FIG. 2 shows another plant that could be used for implementation of the process according to the invention. This plant is different from that shown in FIG. 1 only by the characteristic according to which the separation means for the mixed liquor from pond 2 consist of membrane filtration means 7b including a membrane and no longer a settling tank 7a. These membrane filtration means are provided on a filtration loop composed of the mixed liquor conveyance pipe 6 carrying mixed liquor from the pond 2 and a pipe 9 returning the retentate from membranes towards this pond. These filtration means are either under pressure or are immersed in a pond other than pond 2.

Figure 3:
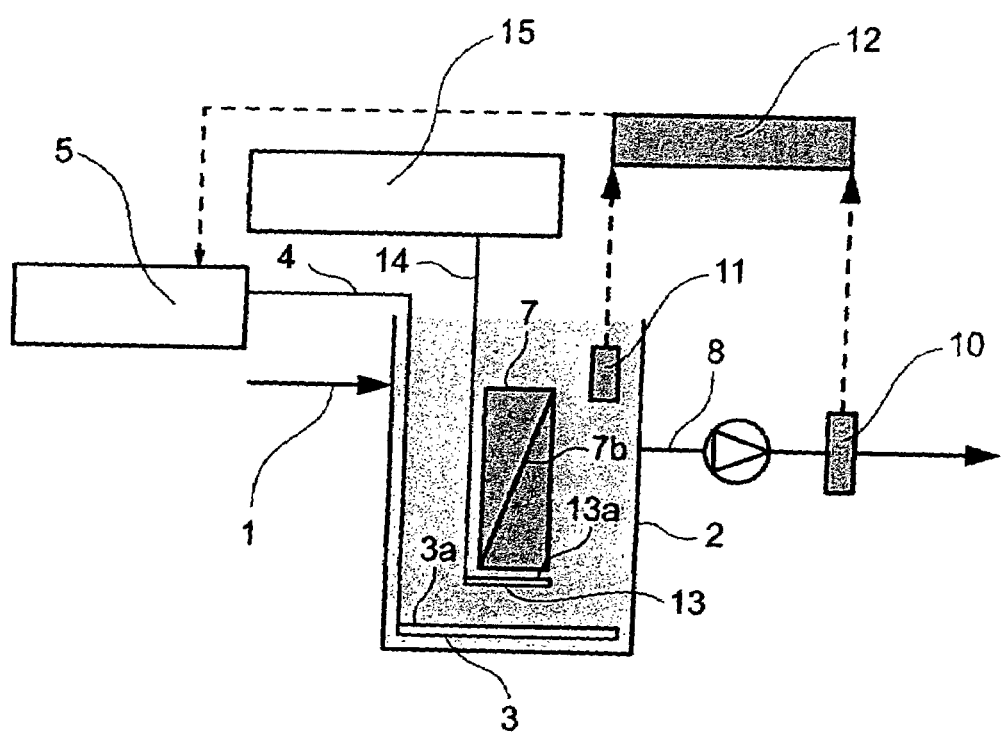

FIG. 3 also diagrammatically shows a third type of plant that could be used for implementation of the process according to the invention.

This plant is only different from that shown in FIG. 2 by the characteristic according to which the membrane separation means 7b are not provided on a filtration loop external to the pond 2, but are immersed in the pond, and by the characteristic according to which these membrane filtration means 7 cooperate with aeration means 13 including an aeration manifold 13a provided under the membranes and designed to dispense air to the membrane to prevent it from getting clogged, or for declogging it if it does get clogged. This manifold 13a is connected by an air inlet pipe 14 to means 15 of starting and stopping aeration of the membrane and adjusting the airflow dispensed by it.

Figure 4:
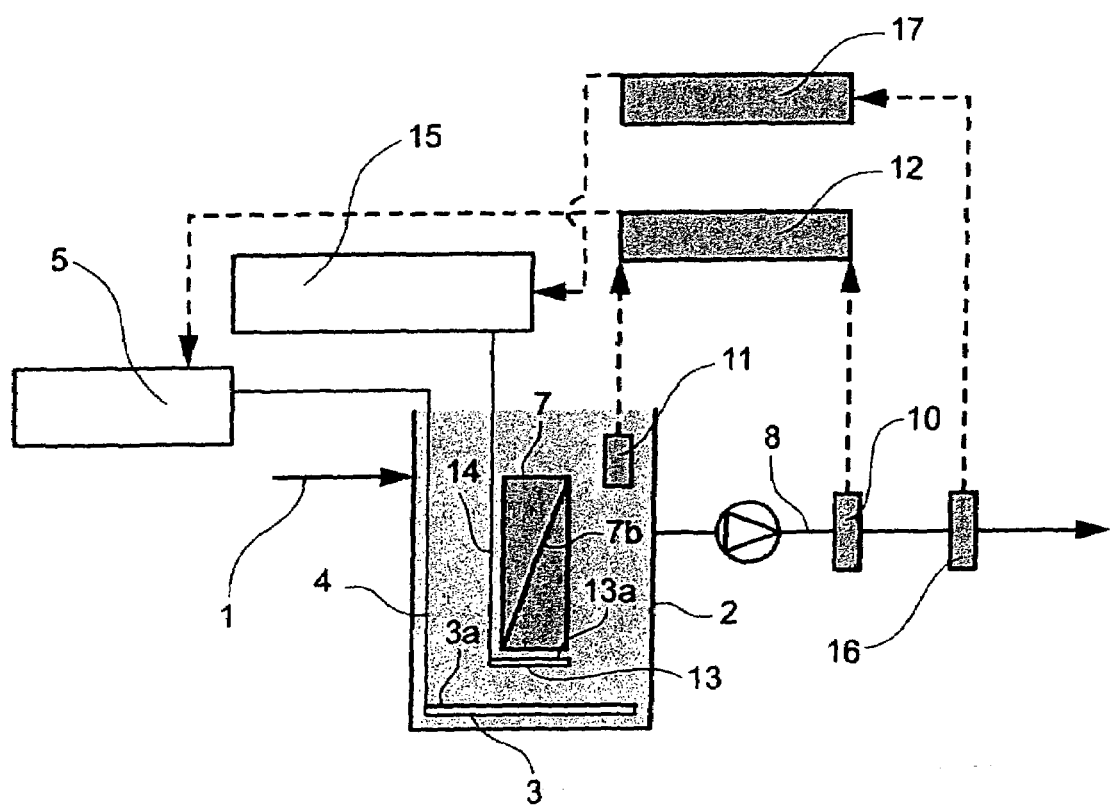

FIG. 4 shows another type of plant for implementation of the process.

This plant is only different from that shown in FIG. 3 by the characteristics according to which a flowmeter 16 is also fitted on the pipe 8, this flowmeter 16 continuously providing information about the filtered water flow output from the membrane filtration means 7b to regulation means 17 acting on the means 15 to start, stop or regulate the airflow dispensed through the manifold 13a.

The plants shown in FIGS. 1 to 4 may be used for the implementation of different variants of the process according to the invention described in detail below with reference to the flowcharts shown in FIGS. 5, 6 and 7.

Figure 5:
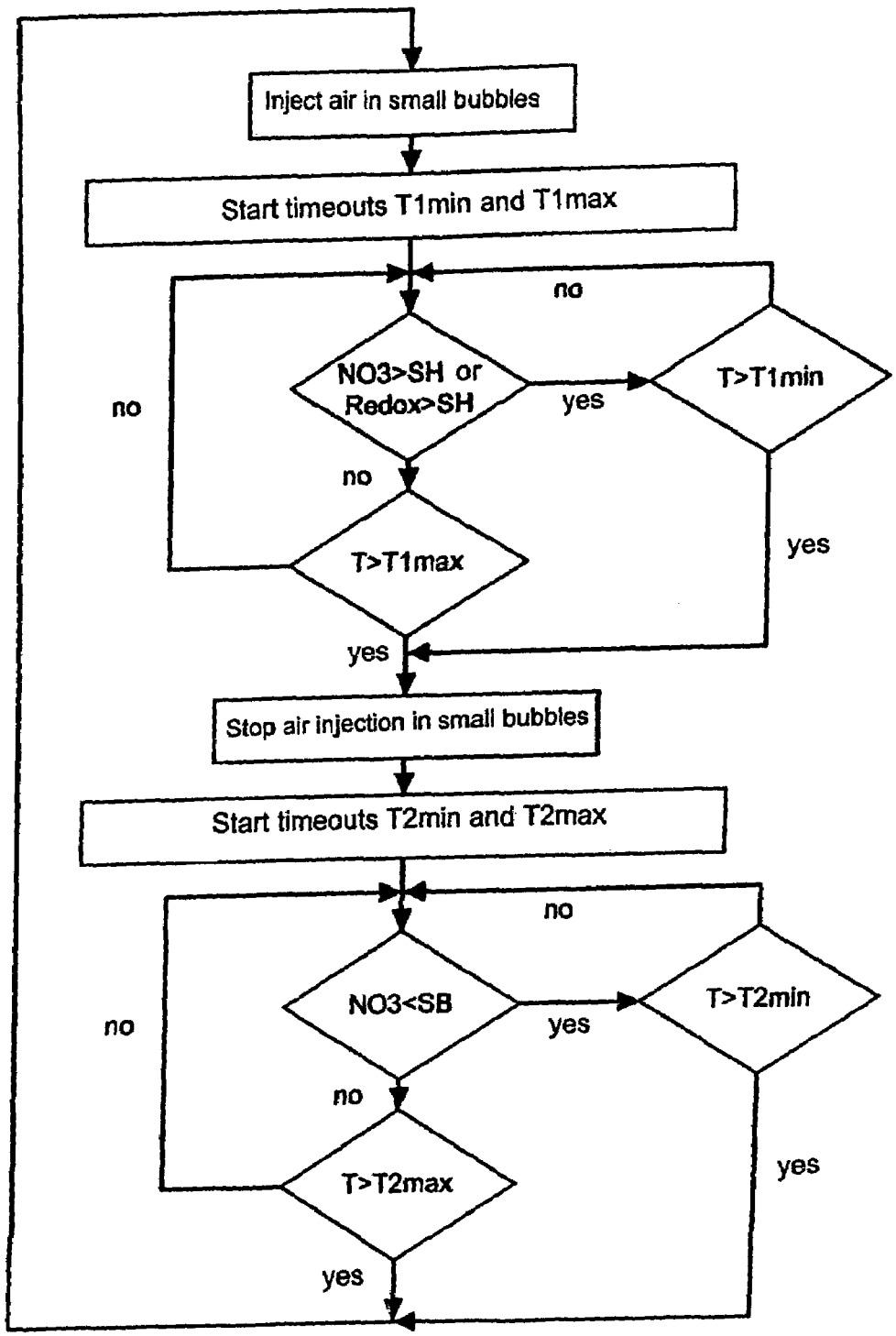
FIGS. 5 to 7 show different flowcharts representing three variants of the process according to the invention.

According to a first variant shown in FIG. 5, the means 12 are configured with a high set value of the treated water nitrate content (SH NO3), a low set value of the nitrate content (SB NO3), a high set value of the redox potential, a minimum aeration time (T1min), a maximum aeration time (T1max), a minimum non-aeration time (T2min), and a maximum non-aeration time (T2max).

The following values for these parameters for the treatment of waste water are given as a non-limitative example:
SH NO3: 6 mg/l
SB NO3: 1 mg/l
SH redox: 150 mV
T1min: 10 min
T1max: 60 min
T2min: 15 min
T2max: 120 min With reference to the flowchart shown in FIG. 5, operation of the plant is then as follows:

The nitrate meter 10 continuously measures the nitrate content in the treated effluent evacuated through the pipe 8 while the instrument 11 continuously measures the redox potential of the mixed liquor present in the aeration pond 2.

As long as the measurement recorded by the nitrate meter 10 does not exceed 6 mg/liter (SHNO3) or as long as the measurement recorded by the instrument 11 does not exceed 150 mV and as long as the minimum aeration duration of 10 min (T1min) has not been reached, the aeration means dispense air through the manifold 3a until the aeration duration has reached 60 minutes (T1max).

When T1max is reached, air injection through the means 5 into the manifold 3a is stopped even if the nitrate content does not exceed 6 mg/l and even if the redox potential does not exceed 150 mV.

Once air injection has been stopped, this stoppage is prolonged as long as the nitrate content measured by the nitrate meter 10 has not reached 1 mg/l (SB NO3) and as long as the minimum non-aeration duration of 15 minutes (T2min) has not been reached).

When T2max (120 min) is reached, aeration is resumed even if the low set value (SB NO3) has not been reached.

The timeouts T1min, T1max, T2min, T2max are used as safeguards in case of a malfunction in the nitrate meter or the redox potential measurement instrument.

Figure 6:
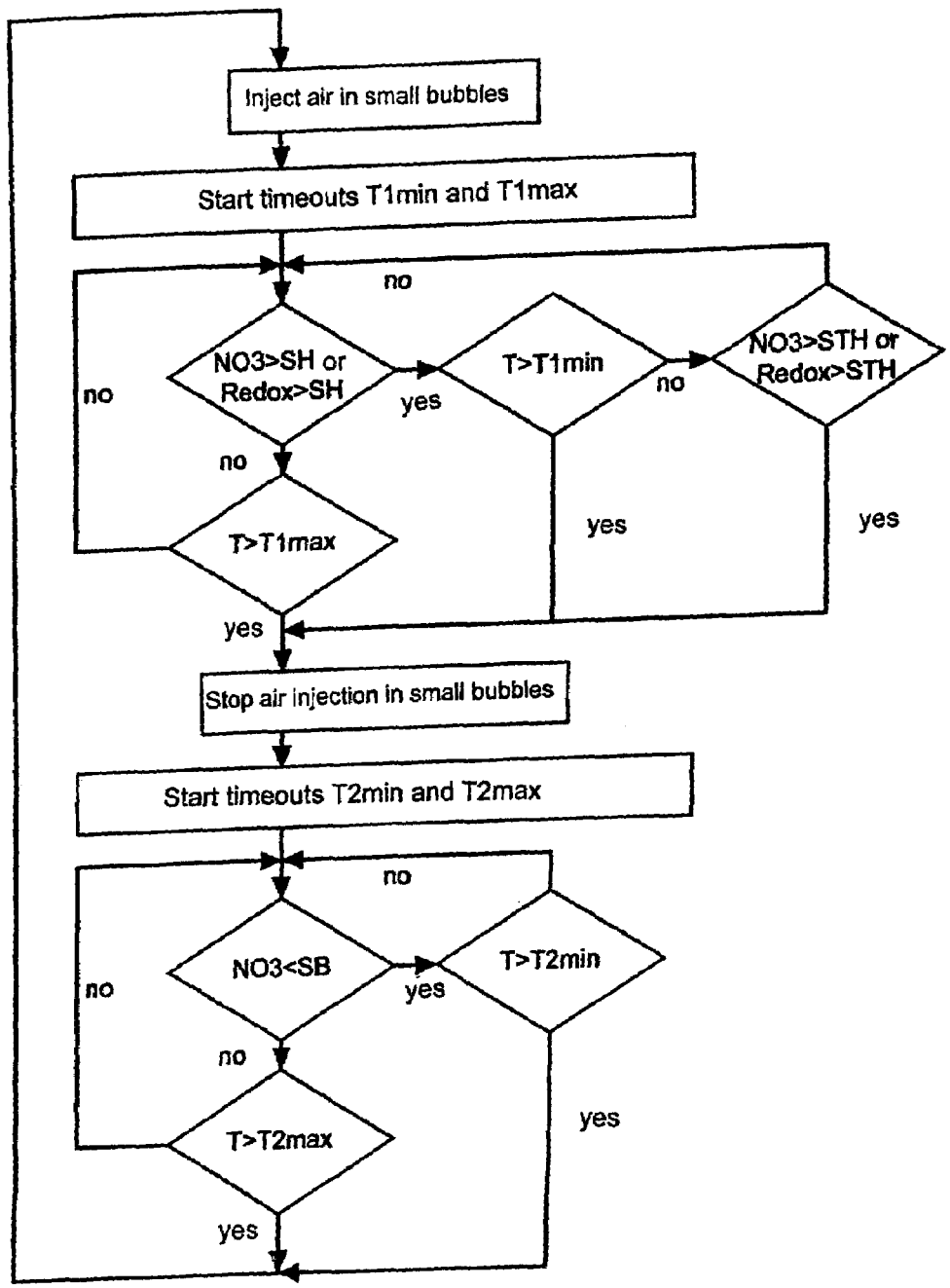

Another variant of the process according to the invention is shown symbolically on the flowchart shown in FIG. 6.

The use of a very high redox potential threshold SH redox limits this aeration in some cases, particularly during periods in which the polluting content is low.

According to this embodiment, the means 12 are configured with a very high nitrate content set value (STH NO3) and a very high redox potential set value (STH redox), in addition to the parameters SH NO3, SB NO3, SH redox, T1min, T2min, T1max, T2max.

For example, STH NO3 may be equal to 13 mg/l and STH redox may be equal to 200 mV.

The use of these very high set values can stop aeration if measurements recorded by the nitrate meter 10 or the redox potential measurement instrument 11 exceed these set values, even if the minimum aeration time has not been respected.

The use of a very high set value for the nitrate content can eliminate the problem of a large number of timeouts adapted to different qualities of the water to be treated.

The use of a very high redox potential set value is particularly useful when the effluent to be treated is diluted.

According to another variant of the process according to the invention described with reference to the flowchart indicated in FIG. 7, the means 12 are also configured with a set value of the slope of the curve representative of the variation with time of the redox potential of the mixed liquor present in the pond. This set value may for example be fixed at 5 mv/min.

The means 12 can continuously calculate this slope (dredox/dt) by using data supplied from the instrument 11, and regulate air injection by increasing the airflow (Qair) if the slope is lower than the set value and vice versa.

Figure 7:
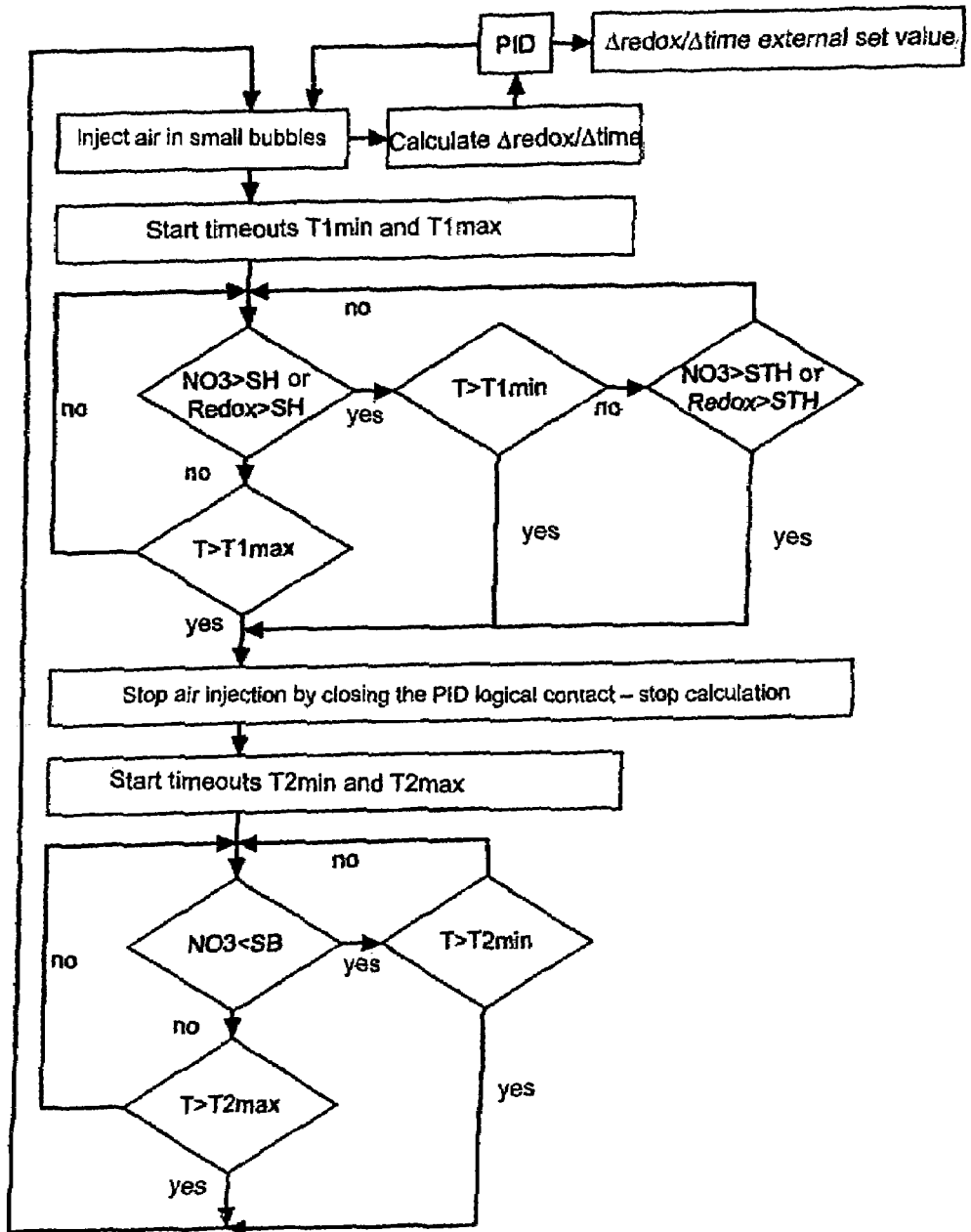

A pilot plant of the type shown in FIG. 3 using membrane filtration means 7 immersed in an active sludge pond 2, was used to test different aeration regulation processes in the pond 2, namely regulation based solely on measuring the redox potential in the active sludge pond, according to the state of the art.

a regulation according to the variant of the process shown symbolically on the flowchart in FIG. 6 ('nitrates-redox regulation');
a regulation according to the variant of the process shown symbolically on the flowchart according to FIG. 7 ('nitrates-redox-redox slope regulation').

The following parameters were used for the nitrate-redox regulation:
SB NO3: 1 mg/l
SH NO3: 6 mg/l
STH NO3: 13 mg/l
SH redox: 150 mV
STH redox: 200 mV The process was tested with raw water with the following pollutions:

total COD: 466 mg/l
NNH4: 36.4 mg/l
N total: 46.7 mg/l

Note that the aeration means were used at two flow rates, namely 5 Nm³/h or 24 Nm³/h.

Figure 8:
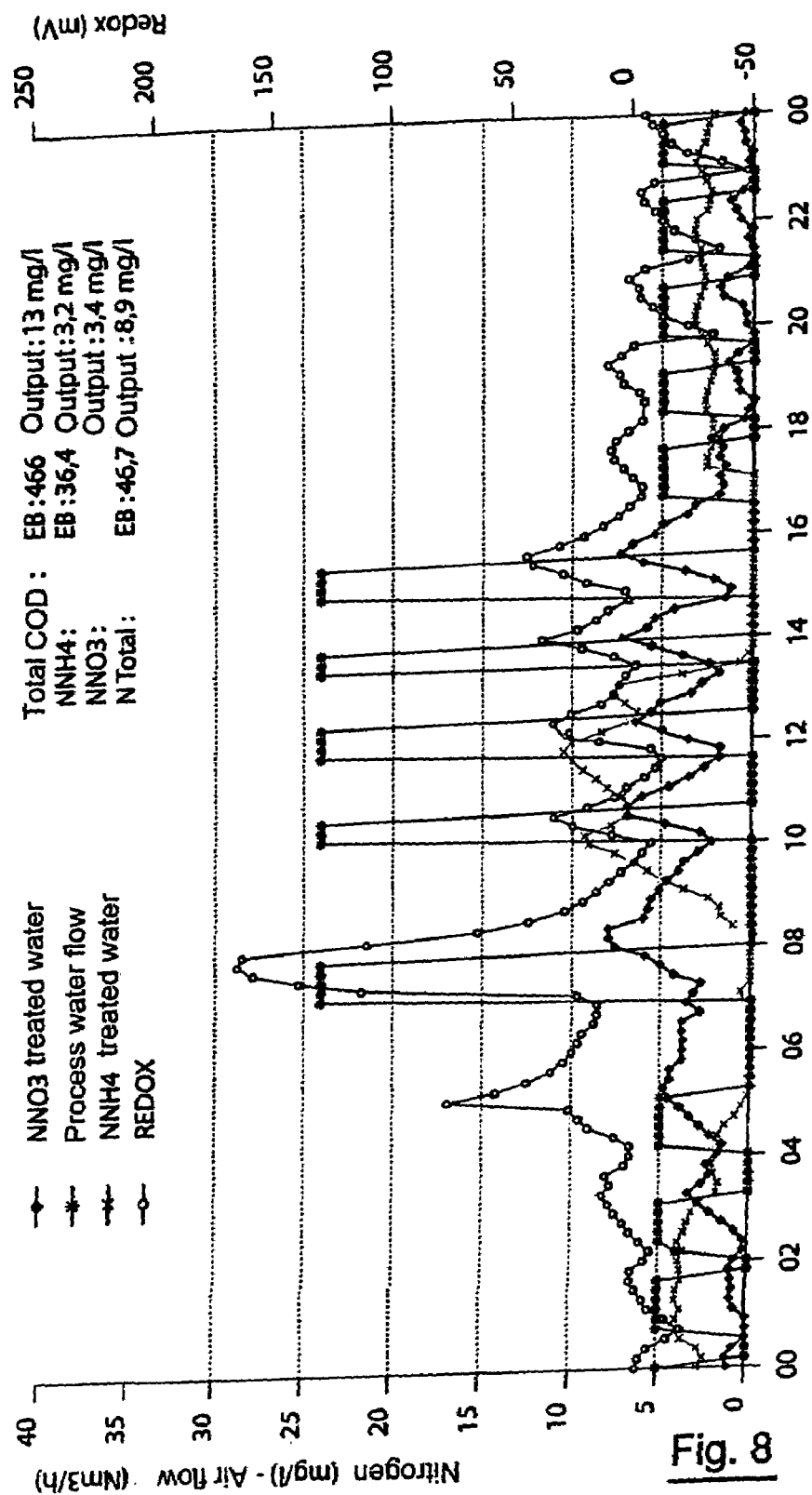
FIG. 8 shows the variation in the content of nitrates in treated water according to a first variant of the process according to the invention (nitrates-redox regulation)

The variation of ammonia and nitrate contents in the treated water and the redox potential of the water present in the pond are shown in FIG. 8. With this type of nitrate-redox regulation according to the invention, the total nitrogen contents in the treated water are equal to 8.9 mg/l.

In the case of an isolated high polluting content, the treatment efficiency may be degraded due to a reduction of nitrification due to a lack of added oxygen.

On the other hand, in the case of a low polluting content, denitrification can be degraded due to an over-aeration during the treatment of a dilute effluent.

When such events occur, the airflows or timeouts need to be adjusted manually during the day. However, such an adjustment can be unreliable if the effluent quality varies too frequently.

The process according to the variant of the invention shown in the flowchart in FIG. 7 ('nitrates-redox slope-redox regulation') may advantageously be used under these conditions.

Figure 9:
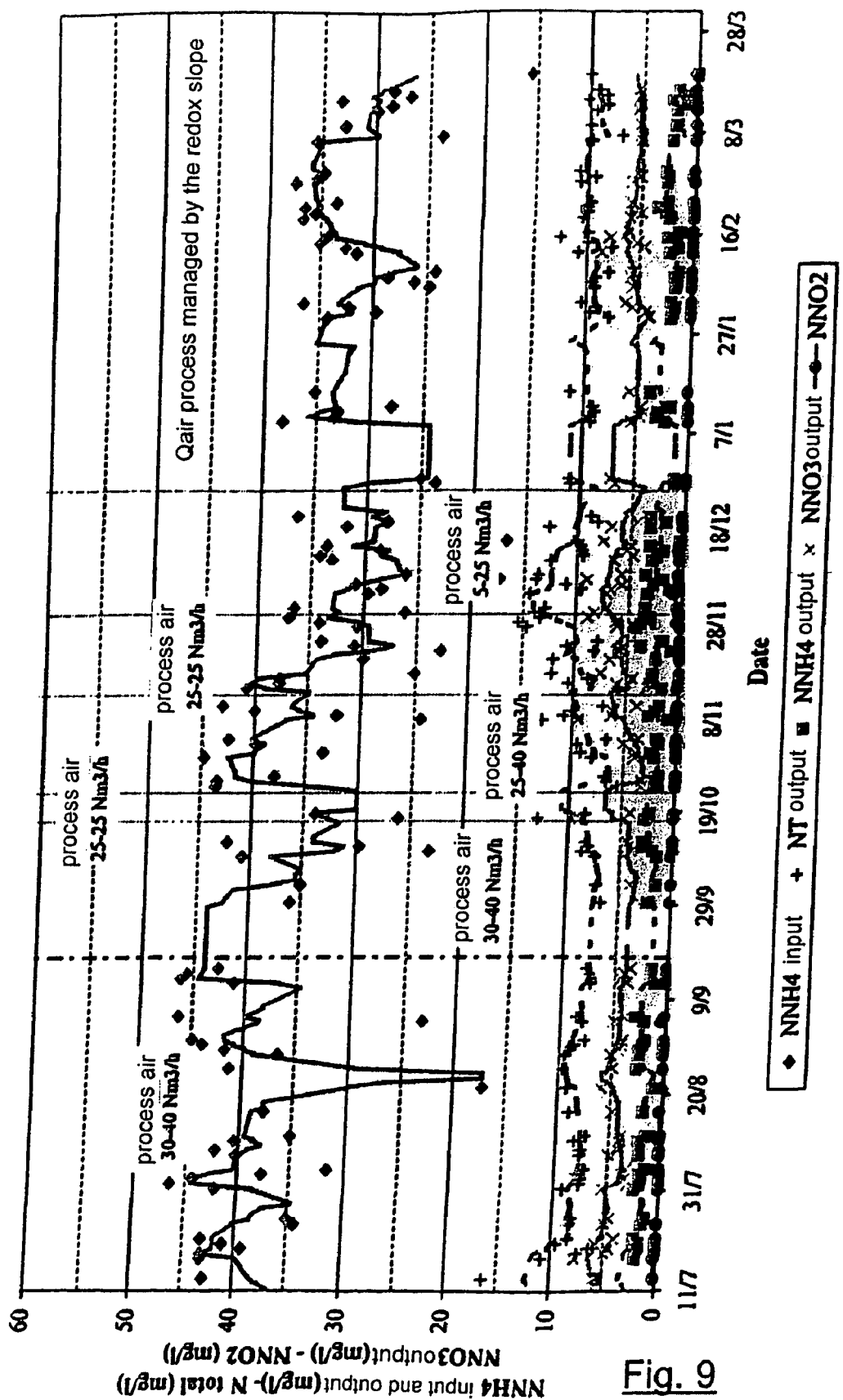
FIG. 9 shows the variation in the content of nitrates in treated water according to a second variant of the process according to the invention (nitrates-redox-redox slope regulation)

FIG. 9 shows the advantage of regulation of the airflow with a slope set value of 5 mV/min. Average nitrogen contents remain at about 10 mg/l, despite the variability in the dilution of the water to be treated.

The invention claimed is:

1. A biological water or wastewater treatment process comprising:
   passing the water or wastewater into at least one biological tank, wherein the biological tank includes at least one free or mixed biomass;
   performing at least one separation step on the water or wastewater in the biological tank to generate sludge and treated effluent;
   measuring a nitrate content of the treated effluent or the water or wastewater;
   measuring a redox potential of the water or wastewater in the biological tank;
   aerating the water or wastewater in the biological tank until either
   (1) an elapsed aeration time exceeds a minimum aeration time and the measured nitrate exceeds a high nitrate set value or the measured redox exceeds a high redox set value; or
   (2) the elapsed aeration time exceeds a maximum aeration time and the measured nitrate is less than or equal to the high nitrate set value or the measured redox is less than or equal to the high redox set value; and
   subjecting the water or wastewater in the biological tank to anoxic treatment until either
   (1) an elapsed anoxic treatment time exceeds a minimum anoxic treatment time and the measured nitrate is less than or equal to a low nitrate set value; or
   (2) the elapsed anoxic treatment time exceeds a maximum anoxic treatment time and the measured nitrate exceeds the low nitrate set value.

2. The biological water or wastewater treatment process of claim 1 wherein aerating the water or wastewater further includes aerating the water or wastewater in the biological tank until the elapsed aeration time exceeds the minimum aeration time and the measured nitrate exceeds a very high nitrate set value or the measured redox exceeds a very high redox set value.

3. The biological water or wastewater treatment process of claim 1 further comprising measuring a slope corresponding to a variation of the measured redox potential with respect to a time period and regulating air flow into the tank while aerating the water or wastewater to generally maintain the measured slope at a preset value.

4. The biological water or wastewater treatment process of claim 1 wherein the separation step comprises a settlement step.

5. The biological water or wastewater treatment process of claim 1 wherein the separation step comprises a filtration step using at least one filtration membrane.

6. The biological water or wastewater treatment process of claim 5 wherein the filtration step comprises passing the water or wastewater from the biological tank in at least one external filtration loop, wherein the external filtration loop includes at least one immersed or pressurized filtration membrane.

7. The biological water or wastewater treatment process of claim 5 wherein the filtration step comprises filtering the water or wastewater in the biological tank through at least one filtration membrane immersed in the biological tank.

8. The biological water or wastewater treatment process of claim 7 further comprising aerating the immersed filtration membrane to prevent clogging or to unclog the membrane.

9. The biological water or wastewater treatment process of claim 1 further comprising regulating an air flow used to aerate the immersed filtration membrane as a function of the flow of the water or wastewater through the filtration membrane.

10. The biological water or wastewater treatment process of claim 1 further comprising regulating air flow into the tank while aerating the water or wastewater to maintain a generally fixed rate of change of the redox potential over a predetermined time period.

* * * * *